Dec. 12, 1933.  P. E. MATTHEWS  1,938,848
LOCKING DEVICE FOR DIFFERENTIAL MECHANISMS
Filed Jan. 26, 1932   2 Sheets-Sheet 1

INVENTOR
Philip E. Matthews,
BY
Redding, Greeley, O'Shea + Campbell
HIS ATTORNEYS Dec. 12, 1933.  P. E. MATTHEWS  1,938,848
LOCKING DEVICE FOR DIFFERENTIAL MECHANISMS
Filed Jan. 26, 1932  2 Sheets-Sheet 2

INVENTOR
Philip E. Matthews,
BY Redding, Greeley, O'Shea & Campbell
HIS ATTORNEYS Patented Dec. 12, 1933

1,938,848

UNITED STATES PATENT OFFICE 1,938,848

LOCKING DEVICE FOR DIFFERENTIAL MECHANISMS

Philip E. Matthews, Plainfield, N. J., assignor to International Motor Company, New York, N. Y., a corporation of Delaware Application January 26, 1932. Serial No. 588,956

6 Claims. (Cl. 192—3.5)

The present invention relates to devices for locking differential mechanisms and embodies, more specifically, an improved locking mechanism which may be actuated in conjunction with the standard gear shifting mechanism of a motor vehicle.

More specifically, the invention embodies an improved locking mechanism for motor vehicle differentials, such locking mechanism being rendered ineffective upon the movement of the gear shifting mechanism to a predetermined speed change position or positions.

In this connection, it is proposed to provide a locking mechanism for power apportioning or differential mechanisms which supply power to a plurality of driving axles, the locking mechanism being actuated either automatically by the shifting of the gear shifting mechanism to a given speed position or actuated manually upon the movement of the gear shifting mechanism to a predetermined position.

The desirability of locking a differential mechanism is well known in as much as conditions frequently arise wherein poor traction under one or more wheels which are supplied with power from a given differential causes all of the power of the power unit to be diverted to such wheels to cause the slipping thereof. In as much as the transmission of the motor vehicle, under such conditions, is usually moved to a low speed position, it is proposed to utilize the mechanism for effecting a low speed change as a means for enabling the differential mechanism of the motor vehicle to be locked.

In accordance with the foregoing, an object of the invention is to provide an improved locking mechanism for differentials of motor vehicles, the actuation of such locking mechanism being controlled by the transmission mechanism.

A further object of the invention is to provide a device of the above character wherein the movement of the transmission mechanism of the motor vehicle into a predetermined speed change position enables the differential locking mechanism to be actuated.

A further object of the invention is to provide a device of the above character wherein movement of the motor vehicle transmission to a predetermined position effects the actuation of the differential locking mechanism.

Further objects, not specifically enumerated above, will be apparent as the invention is described in greater detail in connection with the accompanying drawings, wherein.

Figure 1:
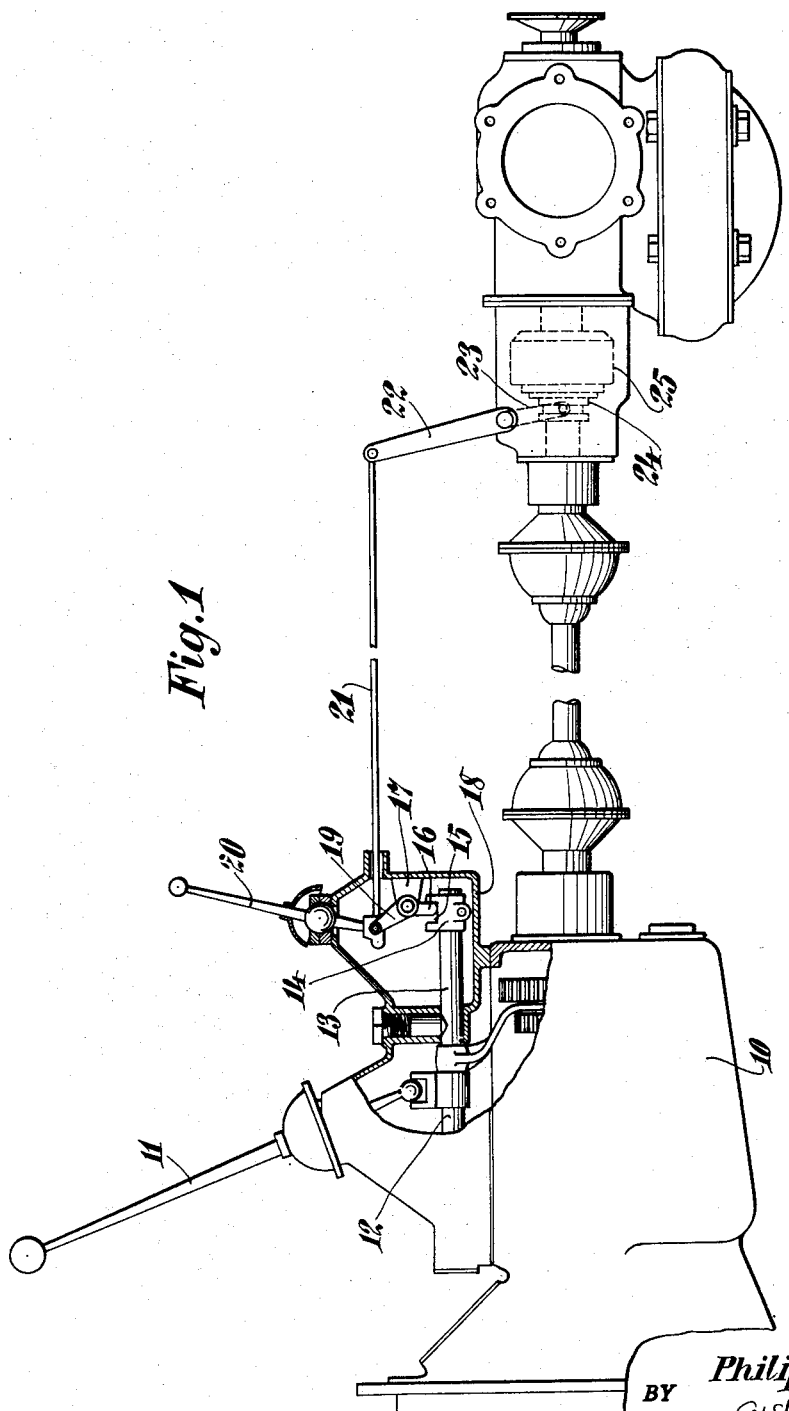
Figure 1 is a view in side elevation showing a device constructed in accordance with the present invention.

With reference to the construction shown in Figure 1, the driving elements of a motor vehicle are illustrated only in so far as is necessary to describe the present invention. A conventional transmission 10 of a motor vehicle is provided with a control lever 11 which is adapted to engage the shifter shafts of the transmission in any well known fashion. In as much as the conditions under which it is desired to lock the differential mechanism usually occur when it is desirable to move the transmission mechanism to a slow speed position, the selector shaft 12 which effects low and reverse speed positions of the transmission is provided with an overhanging extension 13 upon which a bracket 14 is secured. This bracket is formed with a notch 15 within which a lever 16 is received. Lever 16 is pivoted upon a bracket 17 within a housing 18 which may be formed as a part of the cover to the transmission 10. Connected with the lever 16 is a lever 19 which is adapted to be engaged by the lower extremity of a manually actuated lever 20 which is mounted in the housing 18. The lower extremity of lever 20 is connected to a link 21 which is pivoted to the end of a lever 22 which actuates a yoke 23 for shifting the locking mechanism 24 of a differential 25. This locking mechanism may be of the form illustrated in the application of Azor D. Robbins, Ser. No. 578,441 filed December 2, 1931 for Locking mechanism for power apportioning devices, and constitutes no part of the present invention.

The operation of the foregoing mechanism is as follows. The differential 25 is locked by shifting the manual lever 20 to actuate link 21 and lever 22. Simultaneously, lever 20 engages arm 16 with notch 15 and thus establishes a connection with the main transmission by means of which the differential locking mechanism is released or restored to a non-locking position upon shifting of the main transmission lever 11 into a neutral or other speed changing position. In this operation, it is assumed that locking of the differential mechanism is effected by movement of lever 20 to the right and into the position shown in Figure 1. The differential locking mechanism may be unlocked by shifting of the lever 20 to the left as viewed in Figure 1 and thus releasing arm or lever 11 from engagement with the slot 15 in as much as lever 19 is connected to the lower extremity of lever 20.

Figure 2:
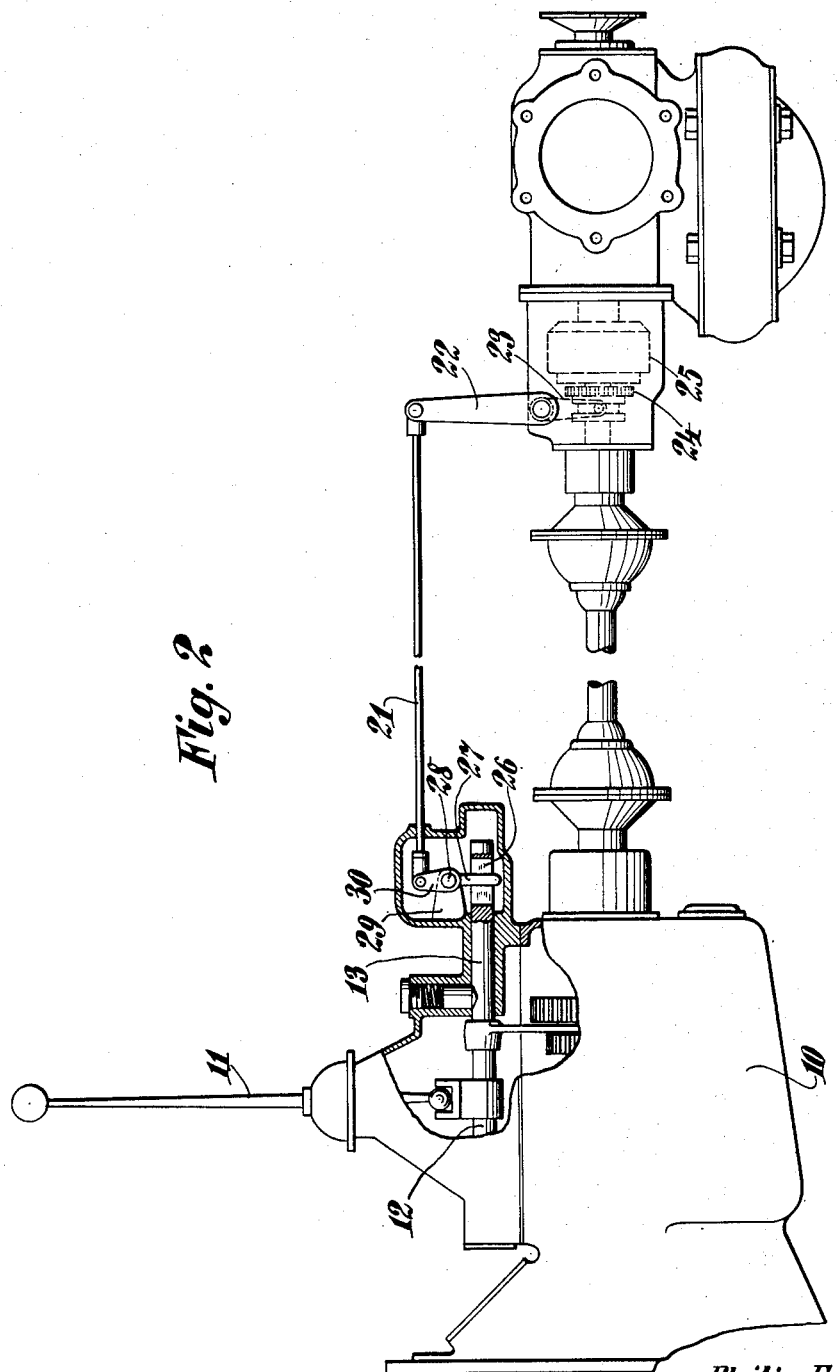
Figure 2 is a view similar to Figure 1, showing a modified form of differential locking mechanism which is actuated automatically by the gear shifting mechanism when such shifting mechanism is moved to a predetermined position.

In the form of invention shown in Figure 2, the extension 13 of shifter shaft 12 is formed with a recessed or grooved portion 26 in which an arm 27 is received. Arm 27 is journaled at 28 in a bracket 29 and is secured to an arm 30 which is connected to the link 21. Movement of shifter shaft 12 to the right as viewed in Figure 2 causes the left hand extremity of groove 26 to engage the arm 27 and move link 30 to the left, thus locking the differential mechanism. The movement of the shifting mechanism to a neutral or another speed changing position releases the locking mechanism in a manner which will be readily apparent.

It will thus be seen that a locking mechanism has been provided wherein a differential mechanism may be locked manually or automatically and the transmission mechanism of the motor vehicle is adapted to control the locking thereof. Such control may be initiated manually as in the form illustrated in Figure 1 or may be initiated automatically, as in the form illustrated in Figure 2, in both forms, the releasing of the locking mechanism being effected automatically.

While the invention has been described with specific reference to the accompanying drawings, it is not to be limited, save as defined in the appended claims.

I claim as my invention:

1. In combination with a differential locking means and a motor vehicle transmission mechanism and instrumentality to actuate the locking means, and means independent of the instrumentality interconnected therewith actuated by the transmission mechanism to restore the actuating means to a non-locking position.

2. In combination with a differential locking means and a motor vehicle transmission mechanism, manual means to actuate the locking means, and means independent of the manual means interconnected therewith actuated by the transmission mechanism to restore the actuating mechanism to a non-locking position.

3. In combination with a differential locking means and a motor vehicle transmission mechanism, said mechanism having a shifter shaft, means to actuate the locking means, and means independent of the last named means interconnected therewith actuated by the shifter shaft to release the actuating means to a non-locking position.

4. In combination with a differential locking means and a motor vehicle transmission mechanism, said mechanism having a shifter shaft to effect a low speed change of the transmission mechanism, means to actuate the locking means, and means independent of the last named means interconnected therewith actuated by the said low speed shifter shaft for actuating the actuating means.

5. In combination with a differential locking means and a motor vehicle transmission mechanism, said mechanism having a shifter shaft to effect a low speed change of the transmission mechanism, means to actuate the locking means, and means independent of the last named means interconnected therewith actuated by the said low speed shifter shaft for releasing the actuating means.

6. In combination with a differential locking means and a motor vehicle transmission mechanism, said mechanism having a shifter shaft to effect a low speed change of the transmission mechanism, means to actuate the locking means, and means independent of the last named means interconnected therewith actuated by the said low speed shifter shaft for actuating the actuating means in both locking and releasing directions.

PHILIP E. MATTHEWS.